US011470069B2

(12) United States Patent
Gillespie

(10) Patent No.: US 11,470,069 B2
(45) Date of Patent: Oct. 11, 2022

(54) WEB BROWSER-BASED DEVICE COMMUNICATION WORKFLOW

(71) Applicant: Tandem Diabetes Care, Inc., San Diego, CA (US)

(72) Inventor: Robert Windsor Gillespie, El Cajon, CA (US)

(73) Assignee: Tandem Diabetes Care, Inc., San Diego, CA (US)

( * ) Notice: Subject to any disclaimer, the term of this patent is extended or adjusted under 35 U.S.C. 154(b) by 200 days.

(21) Appl. No.: 16/747,797

(22) Filed: Jan. 21, 2020

(65) Prior Publication Data

US 2020/0162442 A1 May 21, 2020

Related U.S. Application Data

(63) Continuation of application No. 15/443,346, filed on Feb. 27, 2017, now Pat. No. 10,541,987.
(Continued)

(51) Int. Cl.
*H04L 9/40* (2022.01)
*H04L 41/28* (2022.01)
(Continued)

(52) U.S. Cl.
CPC .......... *H04L 63/08* (2013.01); *H04L 41/0266* (2013.01); *H04L 41/28* (2013.01);
(Continued)

(58) Field of Classification Search
CPC ..... H04L 63/08; H04L 63/062; H04L 63/102; H04L 63/168; H04L 41/0266; H04L 41/28; H04L 67/02
See application file for complete search history.

(56) References Cited

U.S. PATENT DOCUMENTS 5,621,797 A 4/1997 Rosen
6,272,468 B1 8/2001 Melrose
(Continued)

FOREIGN PATENT DOCUMENTS

CN 102175636 B 12/2012
EP 3223689 A2 10/2017
(Continued)

OTHER PUBLICATIONS

Beeck P.O., "Ports & Sockets," Sep. 2002, 1 page.
(Continued)

*Primary Examiner* — Carl G Colin
*Assistant Examiner* — Han Yang
(74) *Attorney, Agent, or Firm* — Patterson Thuente Pedersen, P.A.

(57) ABSTRACT

Systems and methods for controlling a peripheral device with a web browser. A system includes a peripheral device and a user computing device executing a web browser and a device manager, the device manager configured to operate the peripheral device and including a device manager web server. An authentication token can be passed to the web browser from a web server upon coupling of the peripheral device with the user computing device and login by the user with the web browser. The web browser can pass the authentication token to the device manager through the device manager web server. The device manager can transmit the authentication token to the web server to pair the web browser with the device manager.

20 Claims, 6 Drawing Sheets

Related U.S. Application Data

(60) Provisional application No. 62/300,410, filed on Feb. 26, 2016.

(51) Int. Cl.
  *H04L 41/0266* (2022.01)
  *H04L 67/02* (2022.01)

(52) U.S. Cl.
  CPC .......... *H04L 63/062* (2013.01); *H04L 63/102* (2013.01); *H04L 63/168* (2013.01); *H04L 67/02* (2013.01)

(56) References Cited

U.S. PATENT DOCUMENTS

| | | |
|---|---|---|
| 6,442,433 B1 | 8/2002 | Linberg |
| 6,490,052 B1 * | 12/2002 | Yanagidaira .......... G06F 3/1204 358/1.15 |
| 6,564,104 B2 | 5/2003 | Nelson et al. |
| 6,772,331 B1 | 8/2004 | Hind et al. |
| 6,850,252 B1 | 2/2005 | Hoffberg |
| 6,880,564 B2 | 4/2005 | Erickson |
| 6,886,556 B2 | 5/2005 | Fuchs |
| 6,918,542 B2 | 7/2005 | Silverbrook et al. |
| 6,957,655 B2 | 10/2005 | Erickson et al. |
| 6,958,691 B1 | 10/2005 | Anderson et al. |
| 6,966,325 B2 | 11/2005 | Erickson |
| 7,072,725 B2 | 7/2006 | Bristol |
| 7,073,713 B2 | 7/2006 | Silverbrook et al. |
| 7,083,108 B2 | 8/2006 | Silverbrook et al. |
| 7,092,011 B2 | 8/2006 | Silverbrook et al. |
| 7,097,104 B2 | 8/2006 | Silverbrook et al. |
| 7,150,741 B2 | 12/2006 | Erickson et al. |
| 7,181,505 B2 | 2/2007 | Haller et al. |
| 7,187,404 B2 | 3/2007 | Silverbrook et al. |
| 7,201,319 B2 | 4/2007 | Silverbrook et al. |
| 7,204,823 B2 | 4/2007 | Estes et al. |
| 7,231,263 B2 | 6/2007 | Choi |
| 7,234,645 B2 | 6/2007 | Silverbrook et al. |
| 7,254,782 B1 | 8/2007 | Sherer |
| 7,289,142 B2 | 10/2007 | Silverbrook |
| 7,321,263 B2 | 1/2008 | Brabetz et al. |
| 7,324,949 B2 | 1/2008 | Bristol |
| 7,362,971 B2 | 4/2008 | Silverbrook et al. |
| 7,373,083 B2 | 5/2008 | Silverbrook et al. |
| 7,377,706 B2 | 5/2008 | Silverbrook et al. |
| 7,460,152 B2 | 12/2008 | Silverbrook et al. |
| 7,465,285 B2 | 12/2008 | Hutchinson et al. |
| 7,475,825 B2 | 1/2009 | Silverbrook et al. |
| 7,483,050 B2 | 1/2009 | Silverbrook et al. |
| 7,517,440 B2 | 4/2009 | Anex et al. |
| 7,524,045 B2 | 4/2009 | Silverbrook et al. |
| 7,551,202 B2 | 6/2009 | Silverbrook |
| 7,588,046 B1 | 9/2009 | Erickson |
| 7,630,791 B2 | 12/2009 | Nguyen et al. |
| 7,651,489 B2 | 1/2010 | Estes et al. |
| 7,714,757 B2 | 5/2010 | Denison et al. |
| 7,714,889 B2 | 5/2010 | Silverbrook |
| 7,788,369 B2 | 8/2010 | McAllen et al. |
| 7,826,382 B2 | 11/2010 | Sicurello et al. |
| 7,837,647 B2 | 11/2010 | Estes et al. |
| 7,877,489 B2 | 1/2011 | Salesky et al. |
| 7,933,780 B2 | 4/2011 | De La Huerga |
| 7,938,797 B2 | 5/2011 | Estes |
| 7,976,478 B2 | 7/2011 | Fujiwara et al. |
| 7,993,140 B2 | 8/2011 | Sakezles |
| 8,012,119 B2 | 9/2011 | Estes et al. |
| 8,094,009 B2 | 1/2012 | Allen et al. |
| 8,114,350 B1 | 2/2012 | Silver et al. |
| 8,118,770 B2 | 2/2012 | Galley et al. |
| 8,121,857 B2 | 2/2012 | Galasso et al. |
| 8,126,728 B2 | 2/2012 | Dicks et al. |
| 8,126,729 B2 | 2/2012 | Dicks et al. |
| 8,126,730 B2 | 2/2012 | Dicks et al. |
| 8,126,732 B2 | 2/2012 | Dicks et al. |
| 8,126,733 B2 | 2/2012 | Dicks et al. |
| 8,126,734 B2 | 2/2012 | Dicks et al. |
| 8,130,095 B2 | 3/2012 | Allen et al. |
| 8,140,356 B2 | 3/2012 | Dicks et al. |
| 8,155,982 B2 | 4/2012 | Dicks et al. |
| 8,234,128 B2 | 7/2012 | Martucci et al. |
| 8,277,416 B2 | 10/2012 | Gibbs et al. |
| 8,277,435 B2 | 10/2012 | Estes |
| 8,291,337 B2 | 10/2012 | Gannin et al. |
| 8,313,433 B2 | 11/2012 | Cohen et al. |
| 8,323,188 B2 | 12/2012 | Tran |
| 8,344,847 B2 | 1/2013 | Moberg et al. |
| 8,376,943 B2 | 2/2013 | Kovach et al. |
| 8,401,194 B2 | 3/2013 | Nierzwick et al. |
| 8,402,145 B2 | 3/2013 | Holden et al. |
| 8,451,230 B2 | 5/2013 | Celentano et al. |
| 8,454,554 B2 | 6/2013 | Reinke et al. |
| 8,533,475 B2 | 9/2013 | Frikart et al. |
| 8,579,853 B2 | 11/2013 | Reggiardo et al. |
| 8,710,993 B2 | 4/2014 | Hayter et al. |
| 8,712,748 B2 | 4/2014 | Thukral |
| 8,777,895 B2 | 7/2014 | Hsu |
| 8,818,782 B2 | 8/2014 | Thukral et al. |
| 9,173,992 B2 | 11/2015 | Bengtsson et al. |
| 9,483,615 B2 | 11/2016 | Roberts |
| 9,503,526 B2 | 11/2016 | Daoud et al. |
| 9,895,491 B2 | 2/2018 | Ludolph |
| 9,974,903 B1 | 5/2018 | Davis |
| 9,980,140 B1 | 5/2018 | Spencer |
| 10,242,159 B2 | 3/2019 | Kamen |
| 10,456,524 B2 | 10/2019 | Ludolph |
| 10,541,987 B2 * | 1/2020 | Gillespie ................. H04L 63/08 |
| 2002/0075328 A1 * | 6/2002 | Letzelter ............... G06F 3/0481 715/854 |
| 2002/0143580 A1 | 10/2002 | Bristol |
| 2003/0023726 A1 | 1/2003 | Rice |
| 2003/0036683 A1 | 2/2003 | Kehr |
| 2003/0114836 A1 | 6/2003 | Estes |
| 2004/0054263 A1 | 3/2004 | Moerman et al. |
| 2004/0172222 A1 | 9/2004 | Simpson |
| 2004/0172290 A1 | 9/2004 | Leven |
| 2005/0021376 A1 | 1/2005 | Zaleski |
| 2005/0044479 A1 * | 2/2005 | Wiliams ................. G06F 3/124 715/273 |
| 2005/0091316 A1 | 4/2005 | Ponce |
| 2005/0165627 A1 | 7/2005 | Fotsch |
| 2005/0228680 A1 | 10/2005 | Malik |
| 2006/0021031 A1 | 1/2006 | Leahy et al. |
| 2006/0031094 A1 | 2/2006 | Cohen et al. |
| 2006/0184524 A1 | 8/2006 | Pollanz |
| 2007/0016449 A1 | 1/2007 | Cohen et al. |
| 2007/0033074 A1 | 2/2007 | Nitzan et al. |
| 2007/0061735 A1 | 3/2007 | Hoffberg |
| 2007/0136098 A1 | 6/2007 | Smythe et al. |
| 2007/0179355 A1 | 8/2007 | Rosen |
| 2007/0287985 A1 | 12/2007 | Estes et al. |
| 2008/0004601 A1 | 1/2008 | Jennewine et al. |
| 2008/0065926 A1 | 3/2008 | Poth |
| 2008/0071580 A1 | 3/2008 | Marcus et al. |
| 2008/0089313 A1 | 4/2008 | Cayo |
| 2008/0097912 A1 | 4/2008 | Dicks et al. |
| 2008/0097913 A1 | 4/2008 | Dicks et al. |
| 2008/0097914 A1 | 4/2008 | Dicks et al. |
| 2008/0097917 A1 | 4/2008 | Dicks et al. |
| 2008/0103447 A1 | 5/2008 | Reggiardo |
| 2008/0103554 A1 | 5/2008 | Dicks et al. |
| 2008/0122595 A1 | 5/2008 | Yamamichi |
| 2008/0139907 A1 | 6/2008 | Rao |
| 2008/0177154 A1 | 7/2008 | Hansen et al. |
| 2008/0177155 A1 | 7/2008 | Hansen et al. |
| 2008/0215120 A1 | 9/2008 | Dicks et al. |
| 2008/0224852 A1 | 9/2008 | Dicks et al. |
| 2008/0287922 A1 | 11/2008 | Panduro |
| 2008/0294024 A1 | 11/2008 | Cosentino |
| 2009/0006061 A1 | 1/2009 | Thukral |
| 2009/0006129 A1 | 1/2009 | Thukral |
| 2009/0014458 A1 | 1/2009 | Heffron |
| 2009/0018779 A1 | 1/2009 | Cohen et al. |
| 2009/0030733 A1 | 1/2009 | Cohen et al. |

(56) References Cited

U.S. PATENT DOCUMENTS

| | | |
|---|---|---|
| 2009/0037020 A1 | 2/2009 | Brown |
| 2009/0058598 A1 | 3/2009 | Sanchez Sanchez |
| 2009/0058635 A1 | 3/2009 | Lalonde et al. |
| 2009/0077179 A1 | 3/2009 | Bi |
| 2009/0099866 A1 | 4/2009 | Newman |
| 2009/0099867 A1 | 4/2009 | Newman |
| 2009/0115628 A1 | 5/2009 | Dicks et al. |
| 2009/0150186 A1 | 6/2009 | Cohen et al. |
| 2009/0150484 A1 | 6/2009 | Roberts |
| 2009/0156991 A1 | 6/2009 | Roberts |
| 2009/0157202 A1 | 6/2009 | Roberts et al. |
| 2009/0157622 A1 | 6/2009 | Roberts et al. |
| 2009/0157695 A1 | 6/2009 | Roberts |
| 2009/0158274 A1 | 6/2009 | Roberts |
| 2009/0177248 A1 | 7/2009 | Roberts |
| 2009/0177249 A1 | 7/2009 | Roberts et al. |
| 2009/0177769 A1 | 7/2009 | Roberts |
| 2009/0240193 A1 | 9/2009 | Mensinger et al. |
| 2009/0270810 A1 | 10/2009 | DeBelser et al. |
| 2009/0275887 A1 | 11/2009 | Estes |
| 2009/0281393 A1 | 11/2009 | Smith |
| 2010/0011299 A1 | 1/2010 | Brodersen |
| 2010/0023582 A1 | 1/2010 | Pedersen |
| 2010/0142502 A1* | 6/2010 | Shiraki ............... H04W 48/16 370/338 |
| 2010/0146300 A1 | 6/2010 | Brown |
| 2010/0146497 A1 | 6/2010 | Kogan |
| 2010/0160740 A1 | 6/2010 | Cohen et al. |
| 2010/0160759 A1 | 6/2010 | Celentano |
| 2010/0161236 A1 | 6/2010 | Cohen et al. |
| 2010/0161346 A1 | 6/2010 | Getschmann et al. |
| 2010/0174553 A1 | 7/2010 | Kaufman et al. |
| 2010/0198034 A1 | 8/2010 | Thomas et al. |
| 2010/0222648 A1 | 9/2010 | Tan |
| 2010/0248706 A1 | 9/2010 | Potkonjak et al. |
| 2010/0250697 A1 | 9/2010 | Hansen et al. |
| 2010/0269157 A1 | 10/2010 | Experton |
| 2010/0274592 A1 | 10/2010 | Nitzan et al. |
| 2010/0292556 A1 | 11/2010 | Golden |
| 2010/0298662 A1 | 11/2010 | Yu et al. |
| 2010/0324934 A1 | 12/2010 | Selinfreund et al. |
| 2010/0328689 A1* | 12/2010 | Koo .................... G06F 13/102 358/1.9 |
| 2011/0006876 A1 | 1/2011 | Moberg et al. |
| 2011/0009725 A1 | 1/2011 | Hill et al. |
| 2011/0009813 A1 | 1/2011 | Rankers |
| 2011/0044333 A1 | 2/2011 | Sicurello et al. |
| 2011/0066555 A1 | 3/2011 | Dicks et al. |
| 2011/0078441 A1 | 3/2011 | Dicks et al. |
| 2011/0093285 A1 | 4/2011 | Dicks et al. |
| 2011/0093286 A1 | 4/2011 | Dicks et al. |
| 2011/0105854 A1 | 5/2011 | Kiani et al. |
| 2011/0151571 A1 | 6/2011 | Wooldridge |
| 2011/0166875 A1 | 7/2011 | Hayter et al. |
| 2011/0173345 A1* | 7/2011 | Knox ................... H04L 69/08 709/246 |
| 2011/0213621 A1 | 9/2011 | Dicks et al. |
| 2012/0041415 A1 | 2/2012 | Estes et al. |
| 2012/0059673 A1 | 3/2012 | Cohen et al. |
| 2012/0095315 A1 | 4/2012 | Tenbarge et al. |
| 2012/0095393 A1 | 4/2012 | Reinke et al. |
| 2012/0096451 A1 | 4/2012 | Tenbarge et al. |
| 2012/0130204 A1 | 5/2012 | Basta |
| 2012/0165614 A1 | 6/2012 | Strickland et al. |
| 2012/0165728 A1 | 6/2012 | Strickland et al. |
| 2012/0185267 A1 | 7/2012 | Kamen et al. |
| 2012/0191052 A1 | 7/2012 | Rao |
| 2012/0216297 A1 | 8/2012 | Cohen |
| 2012/0307126 A1 | 12/2012 | Bhogal |
| 2013/0019021 A1 | 1/2013 | Lau |
| 2013/0042194 A1 | 2/2013 | Gannon |
| 2013/0050106 A1 | 2/2013 | Chung et al. |
| 2013/0050728 A1* | 2/2013 | Ito ...................... G06F 3/1206 358/1.13 |
| 2013/0094053 A1* | 4/2013 | Shirai ................. G06F 3/1222 358/1.15 |
| 2013/0117696 A1 | 5/2013 | Robertson |
| 2013/0142367 A1 | 6/2013 | Berry |
| 2013/0159456 A1 | 6/2013 | Daoud |
| 2013/0211854 A1 | 8/2013 | Wagstaff |
| 2013/0231711 A1 | 9/2013 | Kaib |
| 2013/0268890 A1 | 10/2013 | Jensen et al. |
| 2013/0298024 A1 | 11/2013 | Rhee |
| 2014/0012511 A1 | 1/2014 | Mensinger et al. |
| 2014/0019952 A1 | 1/2014 | Shamsaasef |
| 2014/0054883 A1 | 2/2014 | Lanigan et al. |
| 2014/0075169 A1 | 3/2014 | Andrews |
| 2014/0113553 A1 | 4/2014 | Brukalo |
| 2014/0180711 A1 | 6/2014 | Kamen |
| 2014/0187890 A1 | 7/2014 | Mensinger |
| 2014/0215587 A1 | 7/2014 | Burch et al. |
| 2014/0300490 A1 | 10/2014 | Kotz |
| 2014/0351712 A1 | 11/2014 | Blomquist |
| 2015/0077038 A1 | 3/2015 | Chao |
| 2015/0126117 A1 | 5/2015 | Wong |
| 2015/0143356 A1 | 5/2015 | Charlton et al. |
| 2015/0143467 A1* | 5/2015 | Hebert ................ H04L 63/168 726/4 |
| 2015/0154369 A1 | 6/2015 | Blomquist |
| 2015/0174320 A1 | 6/2015 | Grant |
| 2015/0248823 A1 | 9/2015 | Jinno |
| 2015/0317437 A1 | 11/2015 | Daoud et al. |
| 2016/0004390 A1 | 1/2016 | Laska et al. |
| 2016/0015888 A1 | 1/2016 | Tieck |
| 2016/0080365 A1 | 3/2016 | Baker |
| 2016/0098848 A1 | 4/2016 | Zamanakos |
| 2016/0103887 A1 | 4/2016 | Fletcher |
| 2016/0129185 A1 | 5/2016 | Ludolph |
| 2016/0212103 A1 | 7/2016 | Rhoads et al. |
| 2016/0224284 A1* | 8/2016 | Fernandes ............ G06F 3/1287 |
| 2016/0328991 A1 | 11/2016 | Simpson |
| 2017/0031638 A1 | 2/2017 | Kitagata |
| 2017/0132377 A1 | 5/2017 | Daoud et al. |
| 2018/0042559 A1 | 2/2018 | Cabrera, Jr. |
| 2018/0169336 A1 | 6/2018 | Blomquist |
| 2018/0336208 A1 | 11/2018 | Kim |
| 2019/0183434 A1 | 6/2019 | Sjolund et al. |
| 2019/0215729 A1 | 7/2019 | Oyman |
| 2019/0253325 A1* | 8/2019 | Coleman .............. H04L 41/12 |
| 2020/0009319 A1 | 1/2020 | Ludolph |
| 2020/0009320 A1 | 1/2020 | Ludolph |

FOREIGN PATENT DOCUMENTS

| | | |
|---|---|---|
| WO | WO-2006020363 A2 | 2/2006 |
| WO | WO-2009124133 A2 | 10/2009 |
| WO | WO-2013184896 A1 | 12/2013 |
| WO | WO 2016/086033 A2 | 6/2016 |

OTHER PUBLICATIONS

Jan Axelson., "Enumeration: How the Host Learns about Devices," USB Complete Fifth Edition, Chapter 04, Mar. 2015, 10 pages.

Application and File history for U.S. Appl. No. 15/443,346, filed Feb. 27, 2017. Inventor: Gillespie et al.

* cited by examiner

WEB BROWSER-BASED DEVICE COMMUNICATION WORKFLOW

RELATED APPLICATIONS

This application is a continuation of U.S. application Ser. No. 15/443,346 filed Feb. 27, 2017, which claims the benefit of U.S. Provisional Application No. 62/300,410 filed Feb. 26, 2016, which is hereby incorporated herein in its entirety by reference.

TECHNICAL FIELD

Embodiments relate generally to computer systems for controlling local system resources. More particularly, embodiments relate to systems and methods for controlling local system resources through a web browser.

BACKGROUND

Most computer systems allow peripheral devices, such as Universal Serial Bus (USB) devices, to be plugged in or otherwise connected to the computer system. USB devices can include audio, printer, mass storage, video, imaging, security devices, medical devices, and so on. Currently, no web browser-agnostic solution exists for controlling, communicating with, or interacting with these devices. Traditional control applications for peripheral devices typically include a GUI to control the device. However, this type of solution is incompatible with web browser-based solutions. A web browser-agnostic solution is desirable because of the ubiquity of web browsers and the consistent look and feel of browser-based user interaction.

However, web browsers typically execute on a user machine under strict security. This strict security is for obvious reasons, as users can interact with any number of malevolent actors or malicious content through the Internet. As a result, access to local system resources such as connected USB devices is typically restricted.

In addition, it is difficult for web servers to determine which web browser and which device manager are on the same computer due to web browser security wrappers. Techniques to determine common computing environments exist (such as by utilizing fingerprinting libraries), but are often inaccurate. For example, fingerprints from a web browser and another local application executing on the same computer have been incorrectly identified as executing on different computers with existing fingerprinting solutions.

Further, new web browsers are more focused on security than previous versions. As a result, many web browsers are restricted from accessing local computer resources, such as coupled peripheral devices. However, web browsers are now ubiquitous on computing devices. Further, in many environments, such as hospitals, only certain (restrictive and peripheral device-disabled) web browsers are allowed, thus requiring solutions for accessing local computer resources from any web browser.

Therefore, there is a need for systems and methods for controlling, communicating with, and interacting with local system resources through a web browser.

SUMMARY

In one embodiment, a system for initializing control of a peripheral device comprises a peripheral device configured to be operably coupled to a user computing device; and a user computing device operably coupled to a communications network, the user computing device comprising: a web browser configured to present web pages to a user, and a device manager configured to operate the peripheral device and request a login page from the web server viewable on the web browser upon coupling of the peripheral device with the user computing device, the device manager including a device manager web server configured to receive a communication from the web browser; wherein the web browser is further configured to receive an authentication token from the web server after transmission of user login information to the web server entered through the login page and pass the authentication token to the device manager through the device manager web server, and wherein the device manager is further configured to authenticate the device manager with the web server by transmitting the authentication token to the web server.

In one embodiment, a method for initializing control of a peripheral device comprises installing a device manager on a user computing device, the device manager configured to operate the peripheral device and including a device manager web server; receiving, with a web server, login information from a web browser executing on the user computing device; transmitting, from the web server, an authentication token to the web browser; receiving, with the web server, the authentication token from the device manager; and pairing the web browser and the device manager based on the shared authentication token so that peripheral device commands can be transmitted by the web server to the device manager.

In one embodiment, a method for controlling a peripheral device with a web browser, the web browser paired to a particular device manager comprises receiving, with a web server, a peripheral device command from a web browser executing on a user computing device; identifying the particular device manager paired with the web browser; routing the peripheral device command to the particular device manager identified as paired with the web browser; and executing the peripheral device command on the peripheral device using the device manager.

In various embodiments, systems allow any web browser running on a user computer to communicate with a device plugged into the user computer. In this way, systems provide web browser-agnostic solutions for peripheral device communication.

In another aspect, a headless device manager installed on the user computer serves as a communication mechanism between a USB device such as an infusion pump and a web browser on the user computer. In embodiments, the headless device manager comprises an engine configured to operate on the user computer without a graphical user interface. Accordingly, the the headless device manager receives inputs and provides output through other interfaces, such as the operably coupled web browser.

In another aspect, users are provided a familiar browser-based experience to interact with the device. The device and web browser communication with an external server can be hidden from the user.

In another aspect, the connected device can be a medical device such as an infusion pump. Embodiments of systems and methods decouple the user computer-web server communication from the proprietary device-device manager communication so control via a web browser can be conducted for any device.

In another aspect, systems allow for modular operation. For example, health care providers can push remote uploads from the connected user device using the provided interfaces from the web server to the device manager and to the device. In such embodiments, other operation of the device is not impacted or affected.

In another aspect, a network provider can provide a web server and access to web server content to control a peripheral device through a device manager application installed on a user computer. In embodiments, the network provider can provide a server engine and database content as described herein. For example, the network provider can provide a server engine including predetermined access commands for the peripheral device and web content that can be transmitted to a web browser operated by a user. In an embodiment, the network provider can further provide access to a downloadable device manager application for installation on a user computer configured to interface to a user peripheral device.

In another aspect, an end user can operate a peripheral device using a user computer and the hardware and software tools described herein; particularly a web browser. For example, an end user can install a device manager application having a device manager web server configured to listen for local calls from the web browser executing on the user computer. The end user can operate the peripheral device with the web browser. In particular, the end user can interface with the web browser user interface to transmit peripheral device commands to a web server, which can relay the calls to the device manager application.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
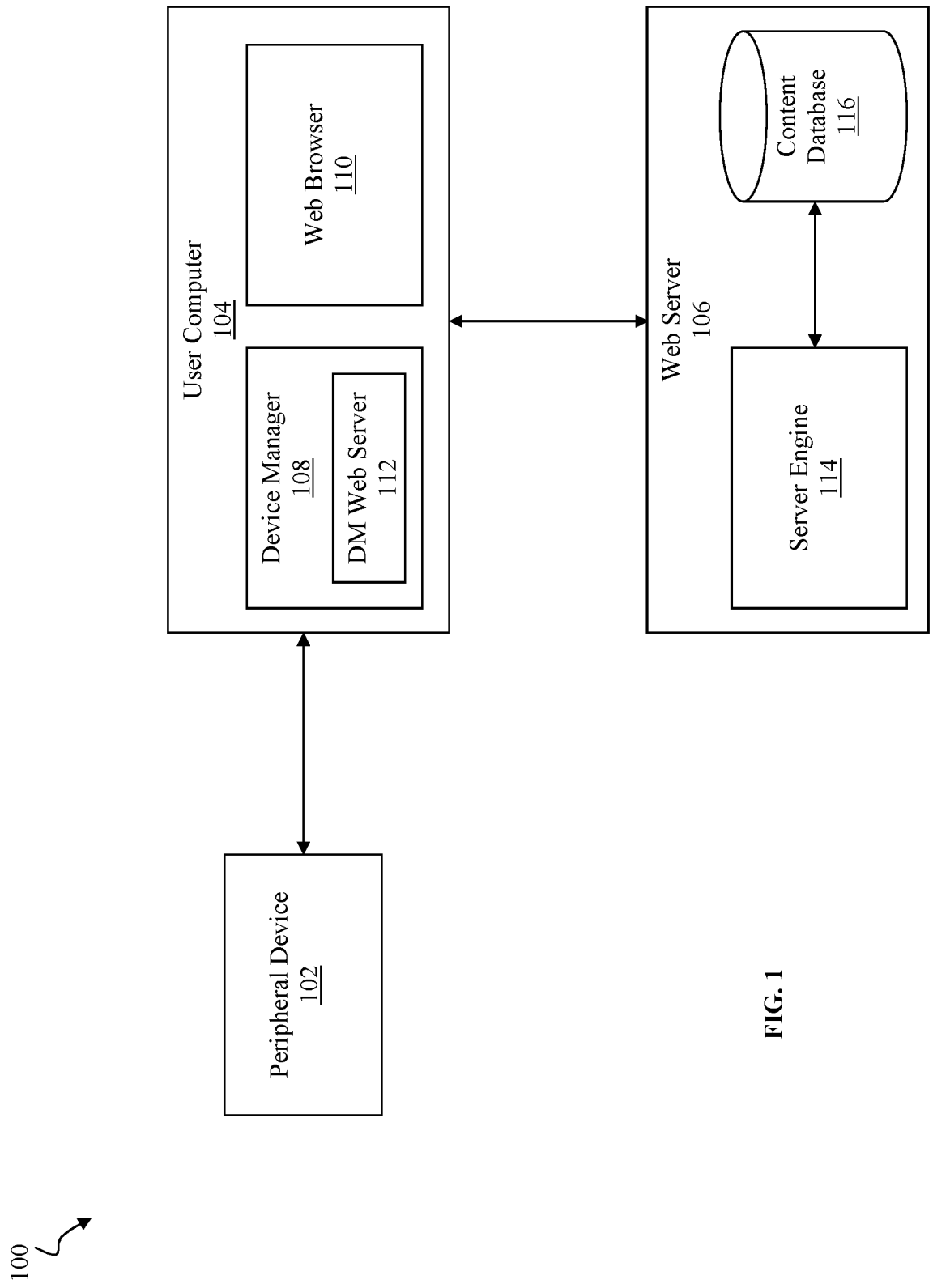
FIG. 1 is a block diagram of a system for controlling a peripheral device with a web browser, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, a block diagram of a system for controlling a peripheral device with a web browser is depicted, according to an embodiment. System 100 generally comprises a peripheral device 102, a user computer 104, and a web server 106.

Embodiments of system 100, and the corresponding methods of configuring and operating system 100, can be performed in cloud computing, client-server, or other networked environment, or any combination thereof. The components of the system can be located in a singular "cloud" or network, or spread among many clouds or networks. End-user knowledge of the physical location and configuration of components of the system is not required.

As will be described, the system and/or its components or subsystems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

In embodiments, the system or components thereof can comprise or include various modules or engines, each of which is constructed, programmed, configured, or otherwise adapted, to autonomously carry out a function or set of functions. The term "engine" as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Peripheral device 102 generally comprises a mobile device, such as a USB device. In an embodiment, peripheral device 102 comprises any device that utilizes USB connections to connect to a computer. In various embodiments, peripheral device 102 can include an audio, printer, mass storage, video, imaging, security, or medical device. In an embodiment, peripheral device 102 can store system 100 data. In embodiments, as will be described, peripheral device 102 can be configured or controlled by user computer 104. For example, peripheral device 102 can comprise a medical pump that can be configured for operation with a user. In an embodiment, peripheral device 102 lacks any processing capability on its own. In such embodiments, peripheral device 102 can be operated on by processors of user computer 104, for example.

As depicted in FIG. 1, peripheral device 102 is operably coupled to user computer 104. In embodiments, peripheral device 102 is physically connected to user computer 104, such as by a cable. In an embodiment, peripheral device 102 can be connected to user computer 104 by a USB cable and exchange data over a USB protocol. In other embodiments, other wired hardware and suitable wired protocols such as FIREWIRE, PS/2, EEPROM, or ETHERNET can be utilized. In other embodiments, peripheral device 102 is operably coupled to user computer 104 by a wireless interface. For example, peripheral device 102 can comprise wireless hardware such as NFC hardware, RFID hardware, WIFI hardware, BLUETOOTH hardware, or any other suitable data transmission hardware and related circuitry, firmware, software, drivers, and other components.

User computer 104 generally comprises a device manager 108 and a web browser 110. In embodiments, as depicted in FIG. 1, user computer 104 is operably coupled to peripheral device 102 and web server 106.

Device manager 108 is configured to manage the interface to peripheral device 102. As such, device manager 108 is configured with hardware and firmware to communicate using the same protocol implemented by peripheral device 102. Device manager 108 can utilize a file system to control how data is stored and retrieved on peripheral device 102. In an embodiment, device manager 108 can implement a proprietary protocol for communication with peripheral device 102.

In embodiments, device manager 108 further comprises device manager (DM) web server 112. In an embodiment, device manager 108 utilizes DM web server 112 for communication with external components of system 100 via web browser 110, as will be described. In an embodiment, DM web server 112 comprises a small web server executing on user computer 104 that can only be called from the local user computer 104 (and particularly, local web browser 110). DM web server 112 is configured to listen for the local call from web browser 110. As depicted in FIG. 1, DM web server 112 is contained exclusively within device manager 108 such that access to DM web server 112 is limited further only to components of user computer 104 that can interface to device manager 108. In embodiments, DM web server 112 provides an application program interface (API) for access to its communications capabilities. Accordingly, access can be limited to those programs (such as web browser 110) that are uniquely identified to have the proper identification within user computer 104. In other embodiments, access to DM web server 112 is provided by hardware identifiers, such as by certain communication ports.

Device manager 108 can be implemented in any appropriate application for rendering web pages in web browsers, such as, e.g., NW.js (formerly known as Node Webkit). In embodiments, NW.js provides a lightweight infrastructure that can implement both a client application and a web server in a single package. In other embodiments, device manager 108 can be implemented in C#, Java, or any other suitable programming language to execute on the hardware of user computer 104. Device manager 108 can utilize JSON (JavaScript Object Notation) lightweight data-interchange format for message transport. In still other embodiments, a lightweight HTTP server and port listener can be implemented as DM web server 112. In embodiments, device manager 108 has no user interface.

In other embodiments, device manager 108 can utilize a web service that makes itself available over the coupled network, using for example, a standardized XML messaging system. Device manager 108 can further communicate with other components on system 100 using a network socket architecture. For example, device manager 108 can communicate directly with web server 106. This communication path between device manager 108 and web server 106 can therefore be assigned a socket identifier. In other embodiments, an address and a port ID can further be assigned by web server 106.

In embodiments, device manager 108 is further configured to transmit and receive tokens utilized by components of system 100 for token-based authentication. For example, JSON Web Tokens (JWT) are a compact and self-contained way for securely transmitting information between parties as a JSON object. In an embodiment, JWT tokens can include iss (issuer), exp (expiration time), sub (subject), and (audience), and other fields that can be utilized within system 100. For example, a user ID (issuer) can be passed from device manager 108 to web server 106 as a supplemental lookup field, as will be described.

Web browser 110 generally comprises a software engine executable on user computer for retrieving, presenting and traversing information resources on a network. An information resource accessible by web browser 110 can be identified by a Uniform Resource Identifier (URI/URL) that may be a web page, image, video or other piece of content. Hyperlinks in information resources enable users easily to navigate web browser 110 to related resources. Web browser 110 is primarily intended to use the World Wide Web, but can also be used to access information provided by web servers in private networks or files in file systems, as described herein. Web browser 110 can be implemented in Ember, ASP, HTML, JavaScript, or any other suitable programming language to execute on the hardware of user computer 104. Example web browsers 110 include FIREFOX, GOOGLE CHROME, INTERNET EXPLORER, OPERA, SAFARI, and MICROSOFT EDGE.

Web server 106 generally comprises a server engine 114 and a content database 116. Web server 106 can be implemented using Node JS and the accompanying website provided by server engine 114 can be implemented by Angular JS. In other embodiments, web server 106 can be implemented in Internet Information Services (IIS), Apache, or any other suitable host service.

Server engine 114 is configured to provide information resource content to web browser 110 and to communicate directly with device manager 108 in certain embodiments. Accordingly, socket IDs can be assigned to both the communication instance between server engine 114 and web browser 110 and the communication instance between server engine 114 and device manager 108. Socket identification data can be stored along with web browser-device manager pairs, as will be described. In further embodiments, sockets can be utilized to push updates for display by web browser 110 (for example, activity of the connected peripheral device), rather than the traditional operation of web browsers that require a user request before updating.

With respect to server engine 114 communications with web browser 110, server engine 114 can provide a web page, image, video, file system directory, or other user interface to peripheral device 102 via web browser 110. In an embodiment, server engine 114 is configured to process and deliver web pages to web browser 110. The communication between web browser 110 and server engine 114 can be by Hypertext Transfer Protocol (HTTP). Pages delivered by server engine 114 can include HTML documents, which can include images, style sheets and scripts in addition to text content.

In an embodiment, server engine 114 can provide a browser user interface (BUI) for interacting with peripheral device 102 via controls presented within web browser 110. For example, server engine 114 can provide a website-style interface to the file structure and server of peripheral device 102. In other embodiments, server engine 114 can provide a layer abstracted from the file structure of peripheral device 102 such that certain predefined actions can be executed with peripheral device 102. For example, if peripheral device 102 is a medical device, server engine 114 can provide a hyperlink viewable with web browser 110 to load a particular medical device application or drug library. In another example, server engine 114 can provide a hyperlink viewable with web browser 110 to update the firmware of peripheral device 102.

In embodiments, server engine 114 can execute processes hidden from the user. For example, server engine 114 can communicate directly with device manager 108. In an embodiment, device manager 108 can transmit information directly to server engine 114. Likewise, once initial handshaking or authentication is established via communication with web browser 110, server engine 114 can transmit information directly to device manager 108 without going through web browser 110.

Content database 116 can store the resources utilized by server engine 114. In embodiments, content database 116 can comprise local volatile or non-volatile memory. In another embodiment, content database 116 can be a general purpose database management storage system (DBMS) or relational DBMS as implemented by, for example, ORACLE, IBM DB2, MICROSOFT SQL SERVER, PostgreSQL, MYSQL, SQLITE, LINUX, or UNIX solutions, in embodiments. For example, content database 116 can store web page templates or designs. In other embodiments, content database 116 can store substantive device content, such as peripheral device 102 drivers or executables.

In an embodiment, browser-based control can be executed locally without web server 106. In such embodiments, only local data stored on, for example user computer 104, would be utilized for display on web browser 110. For example, web browser 110 can utilize DM web server 112 which can comprise an engine similar to server engine 114 and content similar to content database 116. DM web server 112 can accordingly populate web pages with URL calls similar to those executed by web browser 110, but such calls would remain local to user computer 104. Accordingly, web pages could be derived using the token string query described above.

Figure 2:
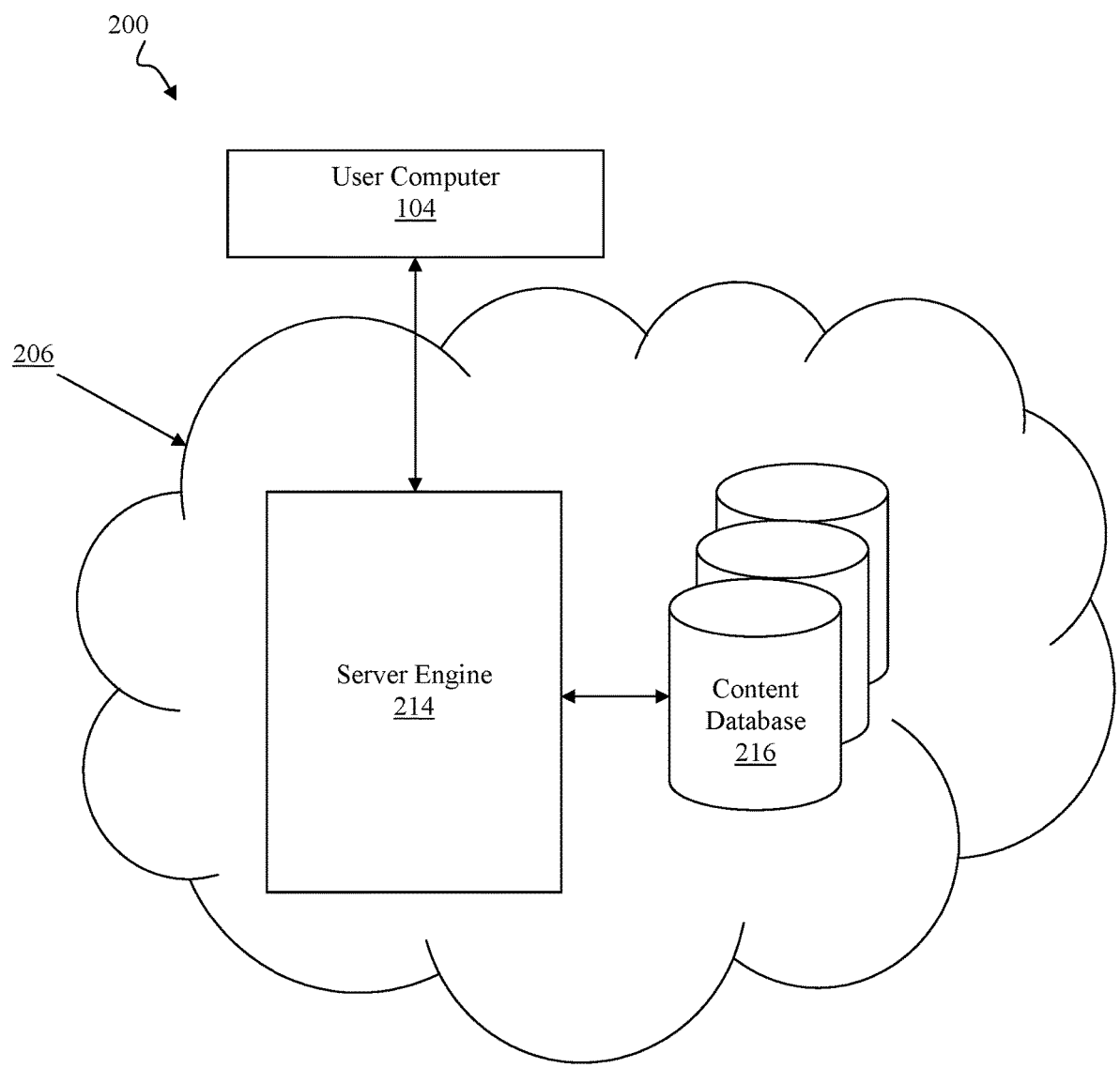
FIG. 2 is a block diagram of another system for controlling a peripheral device with a web browser, according to an embodiment.

Referring to FIG. 2, a block diagram of another system 200 for controlling a peripheral device with a web browser is depicted, according to an embodiment. System 200 generally comprises a peripheral device (not shown), and user computer 104 from FIG. 1. System 200 further comprises a cloud-based web server 206 implemented in a cloud architecture.

Cloud-based web server 206 comprises a cloud-based server engine 214 and a plurality of content databases 216. Cloud-based server engine 214 can be distributed across multiple computers or computing hardware connected over a network. In an embodiment, the functionality of cloud-based server engine 214 can be substantially similar to server engine 114 in FIG. 1. Likewise, content databases 216 can be distributed across multiple storage devices or storage hardware connected over the network. In an embodiment, the functionality of content databases 216 can be substantially similar to content database 116 in FIG. 1.

User computer 104 is depicted as interfacing with cloud-based server engine 214. Accordingly, user computer 104 can know the identity of just one of the distributed computers making up cloud-based server engine 214, or it can know more than one of the distributed computers making up cloud-based server engine 214. Cloud-based server engine 214 can thus provide information resource content to user computer 104 and to communicate directly with user computer 104 via any of the distributed computers using content from any of the distributed content databases 216.

Figure 3:
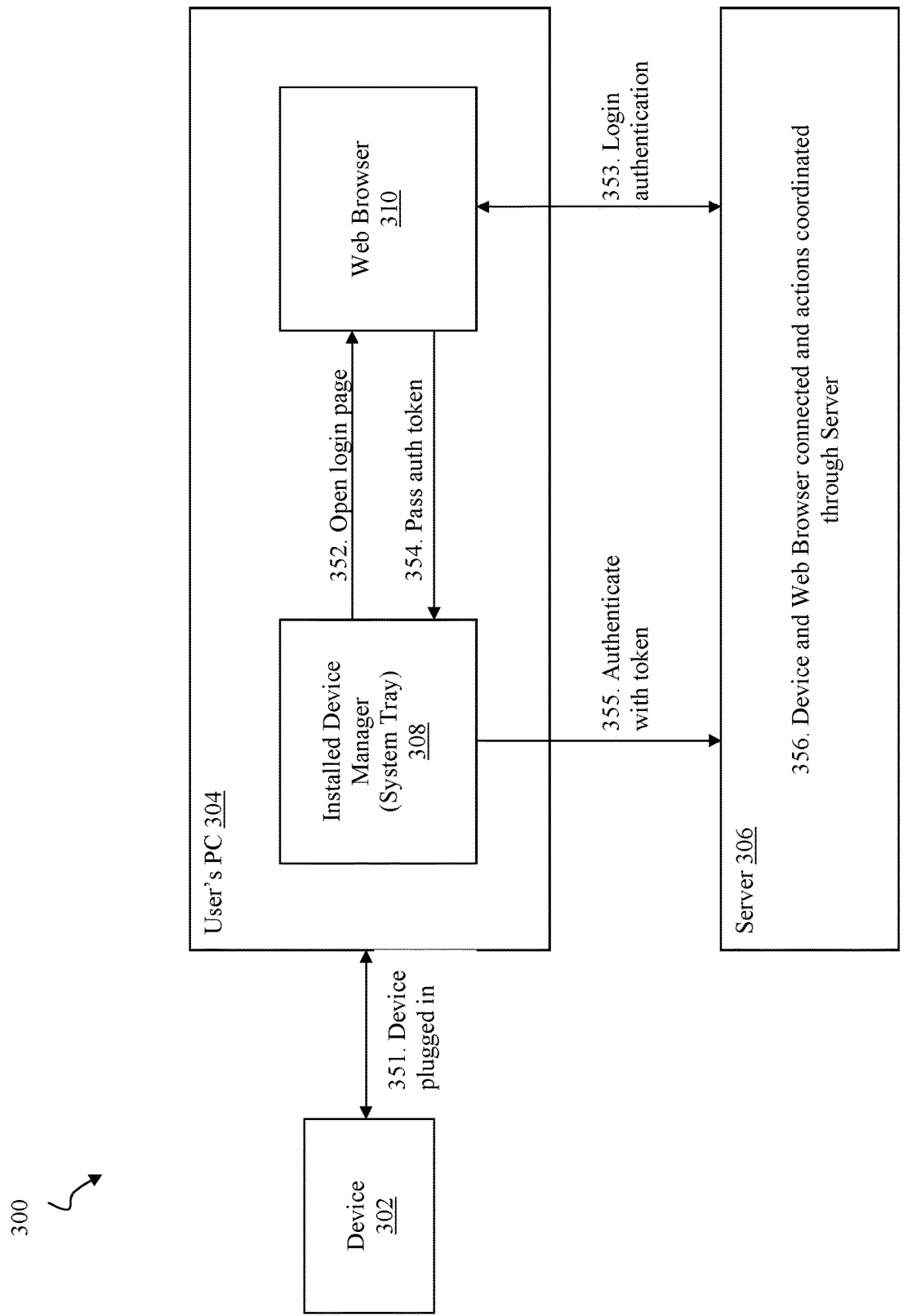
FIG. 3 is a block diagram with annotated workflow of a system for controlling a peripheral device with a web browser, according to an embodiment.

Referring to FIG. 3, a block diagram with annotated workflow of a system 300 for controlling a peripheral device with a web browser is depicted, according to an embodiment. System 300 generally comprises a device 300, a user PC 304, and a server 306.

Device 300 generally comprises a mobile device that is capable of being plugged in and communicatively coupled to user PC 304. In an embodiment, device 300 is substantially similar to peripheral device 102 as described in FIG. 1.

User PC 304 generally comprises a computing device operable by a user that can receive communication coupling from device 302. In an embodiment, user PC 304 is substantially similar to user computer 104 as described in FIG. 1. User PC generally comprises a device manager 308 and a web browser 310.

Device manager 308 is configured to manage the interface to device 302. In an embodiment, device manager 308 can comprise system functions. Accordingly, an icon for device manager 308 can be located in the System Tray for easy access to device manager 308 functions.

Web browser 310 generally comprises a software engine executable on user PC 304 for retrieving, presenting and traversing information resources on a network coupling system 300. In an embodiment, web browser 310 is substantially similar to web browser 110 as described in FIG. 1.

Server 306 is configured to provide information resource content to web browser 310 and to communicate directly with device manager 308, in certain embodiments. In an embodiment, server 306 is substantially similar to web server 106 or cloud-based web server 206 as described in FIG. 1.

An annotated workflow of an example initiation operation is also depicted in FIG. 3 with reference to elements 351-356.

At 351, device 302 can be plugged in to user PC 304. For example, a USB connector cable can be communicatively coupled on one end to device 302 and on another end to user PC 304. Once coupled, device 302 and user PC 304 can initiate handshaking or other initialization procedures to establish a communication channel. The communication channel can allow such that data and/or commands to be transmitted and/or received at either end (both device 302 and user PC 304). For example, device 302 can be registered with device manager 308. In other embodiments, device 302 can be communicatively coupled via wireless protocol. In such embodiments, a physical cable is not needed; instead, connection is made via wireless handshaking.

At 352, device manager 308 can open a login page web site populated from server 306 using web browser 310. For example, device manager 308 can request a login page from server 306. In response to that request, server 306 can configure the login web page viewable to the user on web browser 310.

At 353, the user can access the graphical user interface components of web browser 310 to log in. For example, the user can enter username and password, or other identifying information in combination with shared secret password information into one or more web page fields. This information is sent to server 306 and verified to be accurate from data in server 306 databases. In an embodiment, server 306 can send back an authentication token to web browser 310.

At 354, web browser 310 calls device manager 308 via the local system IP address, which is ubiquitous across all computers, and passes the authentication token in the query string. For example, web browser 310 can use the query string http://127.0.0.1:8000? authtoken=abc123. In embodiments, the authentication token can be passed in cleartext within the string, or be hashed or otherwise encrypted for additional security within user PC 304. In other embodiments, web browser 310 can call device manager 308 via function call or other common user PC bus access. In embodiments, a pointer or database identifier to the authentication token can be passed to device manager 308 instead of in a query string.

At 355, device manager 308 sends the authentication token to server 306 using, for example, its socket connection or other web service-based connection. Server 306 can then establish which particular device manager 308 and web browser 310 are on the same user PC 304 because of the shared authentication token. This linked set data for device manager 308 and web browser 310 can be stored on server 306.

In an embodiment, a database stores pairs of web browsers-device managers including the socket ID for each connection of the web browser to the web server and the device manager to the web server. Socket IDs are in a one-to-one cardinality. In another embodiment, a user ID (issuer) in a JWT token can be passed from device manager 308 to server 306 as a supplemental lookup field to be stored with the pairs.

Once the particular device manager 308 and web browser 310 set is established, device 302 can then be controlled by server 306. For example, at 356, a user can enter commands related to device 302 in web browser 310. Web browser 310 can send the user commands to server 306. Server 306 can relay those commands to device manager 308 for operation of device 302. In an example, a user can command device 302 to be erased in web browser 310. The erase command is forwarded to server 306 and then to device manager 308, which commands the erase of device 302. In another example, if a command is transmitted to server 306 via web browser 310, a lookup of the corresponding device manager socket ID can be conducted due to the socket ID storage in the coupled storage database of server 306.

Figure 4:
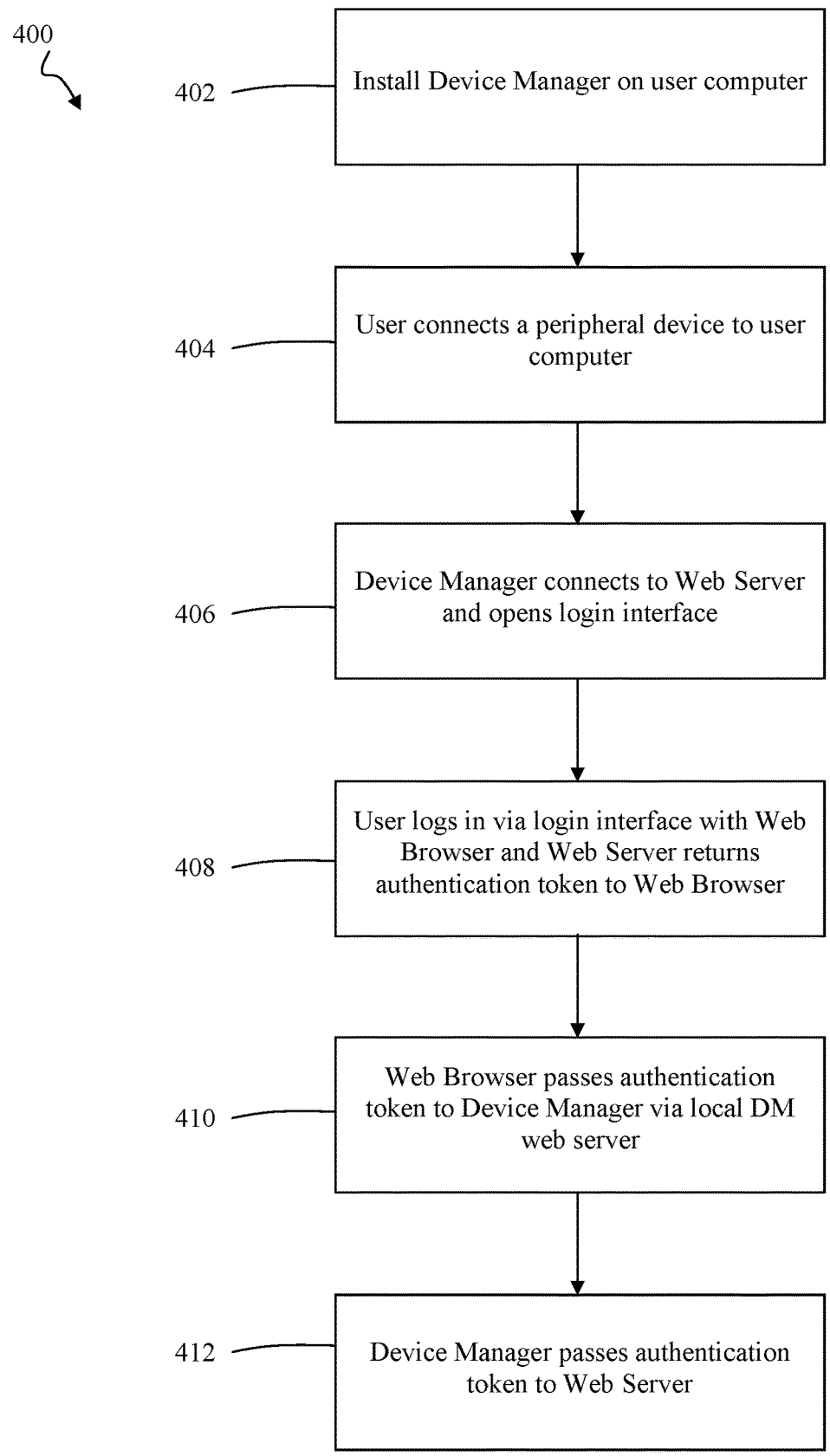
FIG. 4 is a flowchart of a method for initiating for control of a peripheral device with a web browser, according to an embodiment.

Referring to FIG. 4, a flowchart of a method 400 for initiating for control of a peripheral device with a web browser is depicted, according to an embodiment. Method 400 can be implemented by, for example, systems 100, 200, or 300 as described above. However, particular reference will be made to system 100 while describing method 400 for ease of explanation.

At 402, a device manager is installed on a user device. In embodiments, a one-time install of device manager application 108 is conducted on user computer 104. For example, device manager 108 can be installed from a network resource or other resource coupled to user computer 104. Device manager 108 is configured to automatically execute in the system tray when the computer is started. In embodiments, device manager 108 has no user interface.

At 404, a user can connect a peripheral device to the user computer. In embodiments, the user physically connects peripheral device 102 and user computer 104 via USB connection. In embodiments, once connected, device manager 108 can initialize or otherwise prepare peripheral device 102 for operation with user computer 104.

At 406, the device manager connects to a web server and opens a login interface. In embodiments, device manager 108 utilizes web browser 110 to request login content from web server 114. In particular, server engine 114 can receive a login content population request and subsequently access content database 116 to populate login content (such as GUI login fields) for display on web browser 110. In one embodiment, the request for login content is not known to the user operating user computer 104 until web browser 110 is populated with login fields. In such embodiments, web browser 110 can be automatically executed in response to the request. In other embodiments, the user initiates the request for login content by accessing web browser 110 and commanding a particular access request, which can be populated by default on web browser 110. In still other embodiments, a combination of user connecting peripheral device 102 and accepting a prompt initiates the request for login content.

At 408, the user logs in via the login interface using a web browser. The web server verifies the login information and returns an authentication token to the web browser. In embodiments, the user can interact with user interface fields in web browser 110 to input login information. Web browser 110 can transmit this data to server engine 114. In an embodiment, the login information can be verified as accurate from data stored in content database 116. Once verified, server engine 114 transmits an authentication token to web browser 110. In an embodiment, the authentication token can be generated by server engine 114.

At 410, the web browser passes the authentication token to the device manager. In embodiments, web browser 110 passes the authentication token to device manager 108. In one embodiment, web browser 110 can physically pass the authentication token data to device manager 108. In other embodiments, web browser 110 can pass a pointer or query holding the data to device manager 108.

At 412, the device manager passes the authentication token to the web server. In embodiments, device manager 108 utilizes JSON or a suitable web service to transmit the authentication token. For example, device manager 108 can prepare a network packet, such as an HTTP, FTP, or other communications protocol packet including the authentication token using a JSON API. Server engine 114 receives the authentication token and links device manager 108 and web browser 110. In an embodiment, the device manager 108 and web browser 110 pair data can be stored in content database 116.

Figure 5:
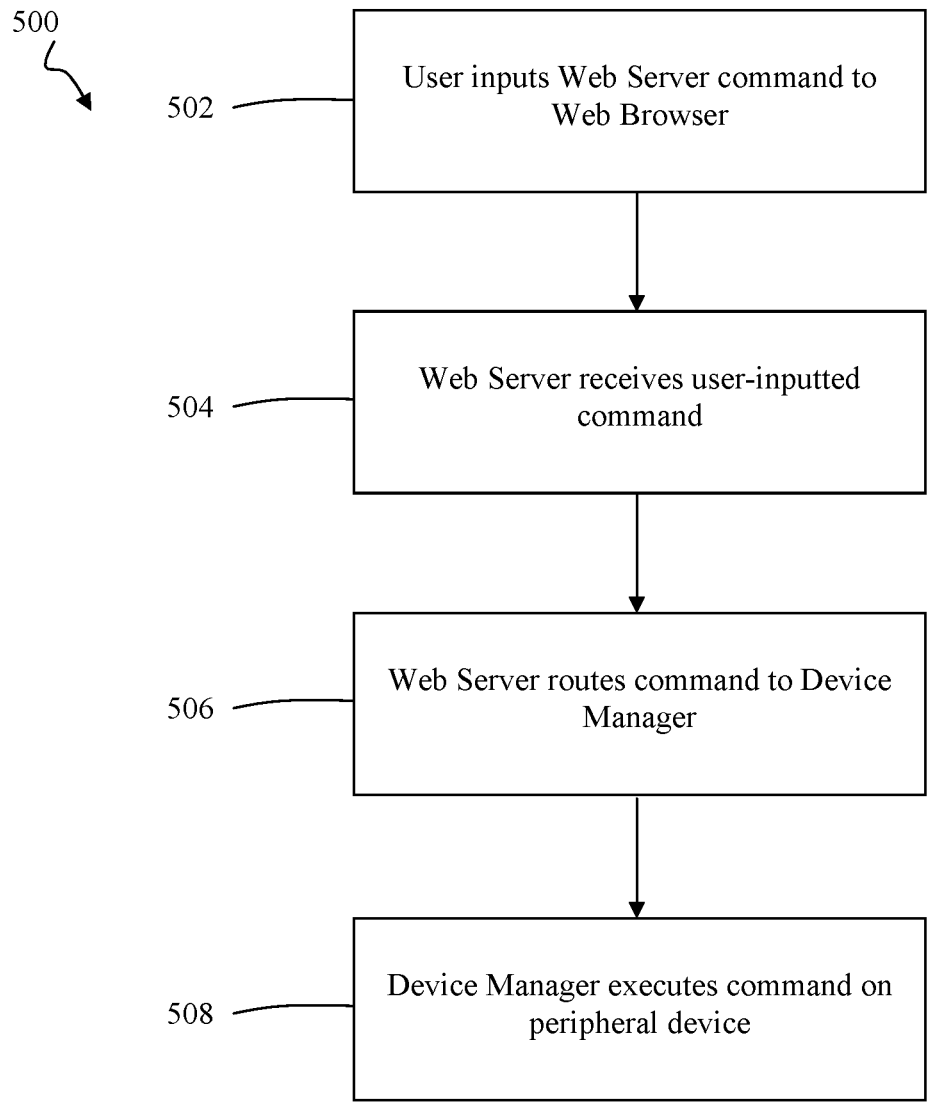
FIG. 5 is a flowchart of a method for controlling a peripheral device with a web browser, according to an embodiment.

Referring to FIG. 5, a flowchart of a method 500 for controlling a peripheral device with a web browser is depicted, according to an embodiment. Method 500 can be implemented by, for example, systems 100, 200, or 300 as described above. However, particular reference will be made to system 100 while describing method 400 for ease of explanation. Method 500 can be executed after execution of methods for initiating control of a peripheral device with a web browser, such as method 400.

At 502, a user inputs a web server command via a web browser. In embodiments, user can access web browser 110 to input a command related to peripheral device 102. For example, the web browser 110 can display an interface of user-selectable commands related to peripheral device 102, such as predefined peripheral device functions represented as hyperlinks. In other embodiments, web browser 110 can include buttons, text fields, or other web page content corresponding to commands that a user can interact with to provide a device command. In embodiments, the web server can populate the fields displayed by web browser 110. Predefined control commands can be populated, in embodiments.

At 504, the web server receives the user-inputted command. In embodiments, web browser 110 utilizes its communication firmware in combination with communication hardware of user computer 104 to transmit the user-inputted command to server engine 114 over the network coupling the components of system 100. For example, web browser 110 can convert the user-inputted peripheral device command into a network packet structure. In an embodiment, the network packet can comprise an IP packet having a header and a payload.

At 506, the web server routes the command to a device manager. In embodiments, server engine 114 transmits the command to device manager 108. For example, server engine 114 can transmit a network packet including the device command over the network coupling the components of system 100. In an embodiment, server engine 114 can access a database, such as content database 116 to determine the particular device manager corresponding to the web browser that transmitted the user-inputted command. For example, a web browser-device manager pair can be stored in content database 116. The pair data can further store the particular user computing device, such as user computer 104 that corresponds to the web browser-device manager pair. In such embodiments, prior to routing the command, the web server can search the database for the web browser-device manager pair data to determine the proper target device manager. For example, the database can be searched based on a web browser identifier to find the corresponding device manager in the pair. In an embodiment, a web browser identifier can comprise a unique ID for the web browser, such as a network address, software identifier (process ID, etc.), hardware identifier (MAC address, etc.), socket ID, or any combination thereof.

At 508, the device manager executes the command on the peripheral device. In embodiments, device manager 108 commands peripheral device 102 with the substantive command. For example, device manager 108 can utilize the particular driver it has stored for peripheral device 102 to execute the command.

Figure 6:
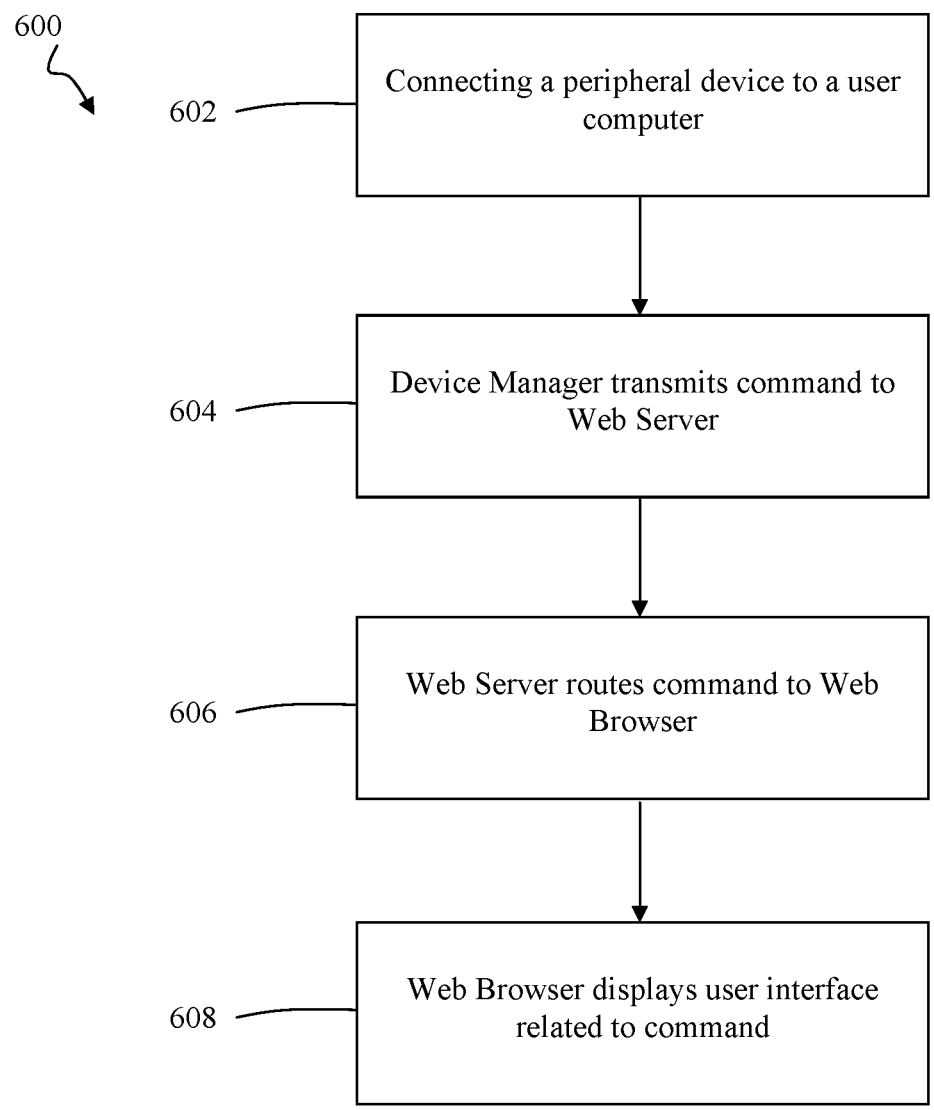
FIG. 6 is a flowchart of a method for controlling a peripheral device initiated by the peripheral device, according to an embodiment.

Control of a peripheral device can be initiated not only by the user (as depicted in FIGS. 4-5, but by the device itself, or by a server. For example, referring to FIG. 6, a flowchart of a method 600 for controlling a peripheral device initiated by the peripheral device is depicted, according to an embodiment. Method 600 can be implemented by, for example, systems 100, 200, or 300 as described above. However, particular reference will be made to system 100 while describing method 600 for ease of explanation. Method 600 can be executed after execution of methods for initiating control of a peripheral device with a web browser, such as method 400.

At 602, a user can connect a peripheral device to the user computer. In embodiments, the user physically connects peripheral device 102 and user computer 104 via USB connection. In embodiments, once connected, device manager 108 can initialize or otherwise prepare peripheral device 102 for operation with user computer 104.

At 604, a device manager coupled to the peripheral device transmits a command related to the peripheral device to a web server. For example, device manager 108 can package the command related to peripheral device 102 and transmit it to web server 106 for receipt by server engine 114. In an embodiment, command can be "monitor the connected device during upload." This command can be issued to web server 106 without user input.

At 606, the web server routes the command to the web browser. For example, web server 106 can route the device command to web browser 110. In the "monitor" example above, web server 106 can further transmit display interface data or packaging related to the device monitoring that web browser 110 can display. For example, an "Uploading . . . " interface can be provided that is unique to that command.

At 608, web browser 110 displays the device data and the display interface data sent by the web server, if applicable. For example, web browser 110 can generate a new web page having an uploading icon and a progress bar reflecting the status of the upload.

In an embodiment, method 600 can execute 604-608 iteratively for a single command. For example, considering the example "monitor the connected device during upload" command, web browser 110 can change display at important steps during the upload corresponding to the sub-commands that make up the larger "monitor the connected device during upload" command. An initial sub-command comprises a start of the uploading. Accordingly, at the start of uploading, device manager 108 can route a "start of the uploading" sub-command to web browser 110 via web server 106 indicating that peripheral device 102 has successfully started uploading. A second sub-command comprises "load into device" in which data is transitionally stored in the peripheral device. Accordingly, device manager 108 can route a "data loaded into device" sub-command to web browser 110 via web server 106 indicating that peripheral device 102 has successfully loaded the requisite data.

Finally, a third sub-command comprises "upload to storage server" in which the data temporarily stored in peripheral device can be transmitted to the storage server. Accordingly, device manager 108 can route an "upload complete" sub-command to web browser 110 via web server 106 indicating that peripheral device 102 has successfully transmitted the data to the storage server.

In another embodiment, a server coupled to the network, such as web server 106, can poll device manager 108 for updates to the peripheral device. Similar to method 600, once the peripheral device is connected, web server 106 can poll device manager 108 for updates from peripheral device 102 to then send for display to web browser 110. In an embodiment, the web page displayed by web browser 110 can be static except for the dynamically-updated socket connection pushing new data to a particular web browser 110 field. For example, if peripheral device 102 is disconnected, device manager 108 can be polled via web server 106 for display on web browser 110.

Further details regarding such infusion pumps and medical devices can be found in commonly owned U.S. Pat. Nos. 8,287,495; 8,408,421 8,448,824; 8,573,027; 8,650,937; 8,986,523; 9,173,998; 9,180,242; 9,180,243; 9,238,100; 9,242,043; 9,335,910; 9,381,297; 9,421,329; 9,486,171; 9,486,571; 9,503,526; 9,555,186 and 9,565,718 commonly owned U.S. Patent Publication Nos. 2009/0287180; 2012/0123230; 2013/0053816; 2013/0332874; 2014/0276419; 2014/0276420; 2014/0276423; 2014/0276531; 2014/0276553; 2014/0276556 2014/0276569; 2014/0276570; 2014/0276574; 2014/0378898; 2015/0073337; 2015/0182693; 2015/0182695; 2016/0030669; 2016/0082188 and 2016/0339172 and commonly owned U.S. patent application Ser. Nos. 14/707,851; 15/241,257; 15/354,495 and 15/394,066 and commonly owned U.S. Provisional Application Ser. Nos. 61/911,576; 61/920,902; 61/920,914; 61/920,940; 62/139,275; 62/352,164; 62/365,1671 62/394,806 and 62/445,041 each of which is hereby incorporated by reference in its entirety.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for managing a wireless peripheral device via a wireless network, the system comprising:
 a web server operably coupled to the wireless network, the web server including a computing platform including computing hardware of at least one processor and memory operably coupled to the at least one processor; and
 instructions that, when executed on the computing platform, cause the computing platform to implement:
  a server engine configured to:
   responsive to a wireless coupling of the wireless peripheral device to the wireless network, generate a login page for an application configured to present web pages on a user device,
   receive login information from the application via the login page,
   authenticate the login information,
   transmit a shareable authentication token to the application, the shareable authentication token to be shared with a device manager operating on the user device,
   receive the shareable authentication token from the device manager, and
   pair the application and the device manager based on the shareable authentication token as an authenticated application-device manager pair establishing that the application and the device manager are on the same user device.

2. The system of claim 1, wherein the server engine is further configured to control the wireless peripheral device over the wireless network by transmitting peripheral device commands to the device manager.

3. The system of claim 2, wherein the server engine is further configured to provide a browser user interface (BUI) for the application to control the wireless peripheral device via controls presented within the application.

4. The system of claim 3, wherein the controls presented within the application include one or more predefined actions to be executed by the wireless peripheral device.

5. The system of claim 2, wherein a peripheral device command comprises a multi-part command including a first sub-command and a second sub-command,
 wherein the server engine is further configured to receive the first sub-command from the device manager and transmit an update to at least a portion of a web page related to the first sub-command, and
 wherein the server engine is further configured to receive the second sub-command from the device manager and transmit an update to at least a portion of the web page related to the second sub-command.

6. The system of claim 1, wherein the wireless coupling of the wireless peripheral device comprises successfully completing wireless handshaking with the wireless network.

7. The system of claim 1, wherein the server engine is further configured to:
poll the wireless peripheral device for updated data from the wireless peripheral device; and
push the updated data to the application without a request from the application.

8. A method for managing a wireless peripheral device via a wireless network, the method comprising:
providing a web server operably coupled to the wireless network, the web server including a computing platform including computing hardware of at least one processor and memory operably coupled to the at least one processor;
responsive to a wireless coupling of the wireless peripheral device to the wireless network, generating, with the web server, a login page for an application configured to present web pages on a user device,
receiving, with the web server, login information from the application,
authenticating the login information,
transmitting, with the web server, a shareable authentication token to the application, the shareable authentication token to be shared with a device manager operating on the user device,
receiving, with the web server, the shareable authentication token from the device manager, and
pairing, with the web server, the application and the device manager based on the shareable authentication token as an authenticated application-device manager pair establishing that the application and the device manager are on the same user device.

9. The method of claim 8, further comprising:
controlling, using the web server, the wireless peripheral device over the wireless network by transmitting peripheral device commands to the device manager.

10. The method of claim 9, further comprising:
providing a browser user interface (BUI) for the application to control the wireless peripheral device via controls presented within the application.

11. The method of claim 10, wherein the controls presented within the application include one or more predefined actions to be executed by the wireless peripheral device.

12. The method of claim 9, wherein a peripheral device command comprises a multi-part command including a first sub-command and a second sub-command, the method further comprising:
receiving the first sub-command from the device manager;
transmitting an update to at least a portion of a web page related to the first sub-command;
receiving the second sub-command from the device manager; and
transmitting an update to at least a portion of the web page related to the second sub-command.

13. The method of claim 8, wherein the wireless coupling of the wireless peripheral device comprises successfully completing wireless handshaking with the wireless network.

14. The method of claim 8, further comprising:
polling the wireless peripheral device for updated data from the wireless peripheral device; and
pushing the updated data to the application without a request from the application.

15. A user device for controlling a wireless peripheral device, the user device comprising:
at least one processor and memory operably coupled to the at least one processor; and instructions that, when executed on the processor, cause the processor to implement:
a device manager configured to:
responsive to the wireless peripheral device connecting to a network operably coupling the user device and the wireless peripheral device, request a login page from an external web server using a device manager (DM) web server, and
initialize a communication channel between the wireless peripheral device and the user device,
an application configured to:
receive the login page request from the DM web server,
transmit the login page request to the external web server,
receive login web page data from the external web server and present a login web page on the user device,
transmit user data entered via the login page to the external web server,
receive a shareable authentication token from the external web server,
pass the shareable authentication token to the device manager by calling the DM web server,
wherein the device manager is further configured to authenticate the device manager with the external web server by transmitting the shareable authentication token to the external web server.

16. The user device of claim 15, wherein the wireless peripheral device is remote from the user device.

17. The user device of claim 15, wherein the device manager is further configured to implement a file system to control how data is stored on and retrieved from the wireless peripheral device.

18. The user device of claim 15, wherein the DM web server is only called from the user device.

19. The user device of claim 15, wherein the application calls the DM web server with a local system IP address.

20. The user device of claim 15, wherein passing the shareable authentication token to the device manager comprises passing a pointer or query holding the shareable authentication token data to the device manager.

* * * * *